May 23, 1944.   H. OSTERBERG ET AL   2,349,457
VERTICAL ILLUMINATOR FOR MICROSCOPES
Filed Jan. 2, 1941   2 Sheets-Sheet 1
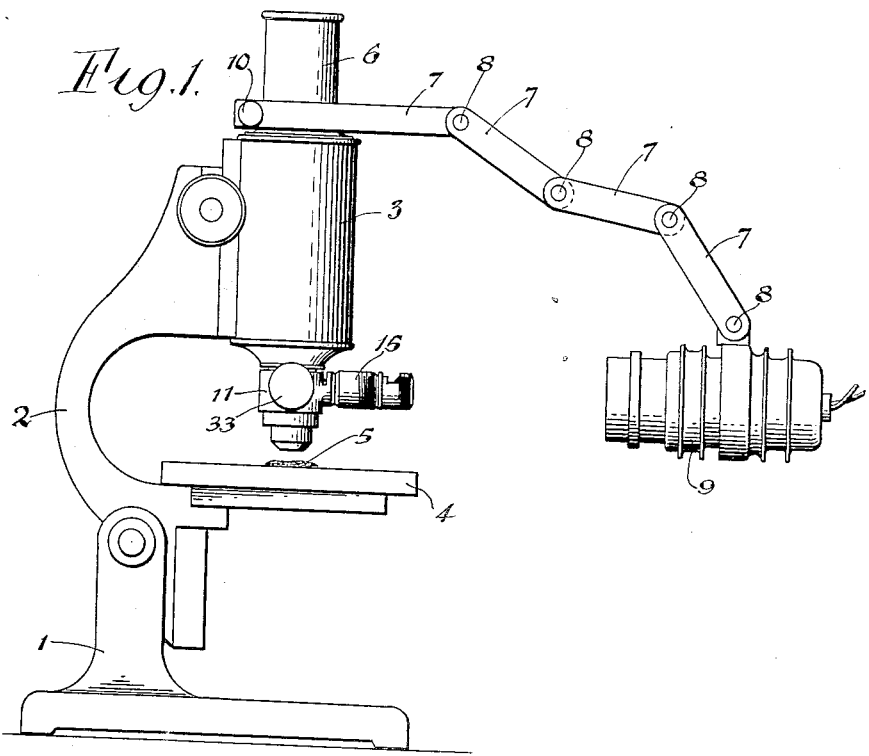
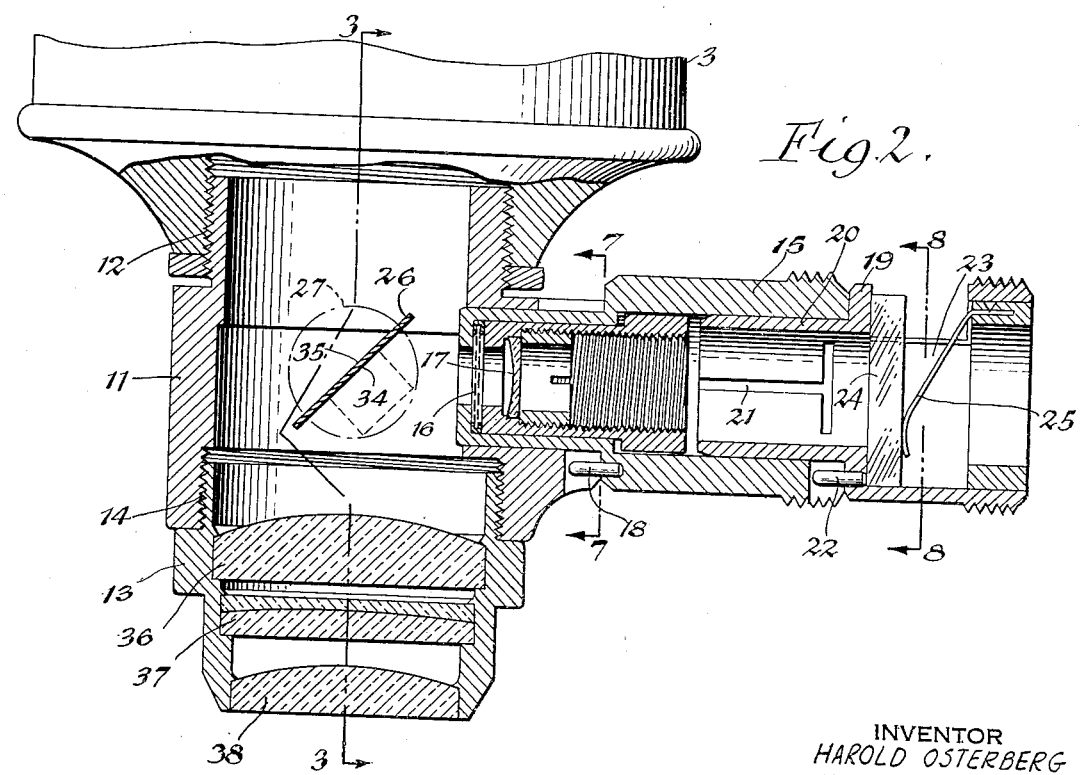
INVENTOR
HAROLD OSTERBERG
BY KENNARD W. HARPER
Raymond A. Paquin
ATTORNEY

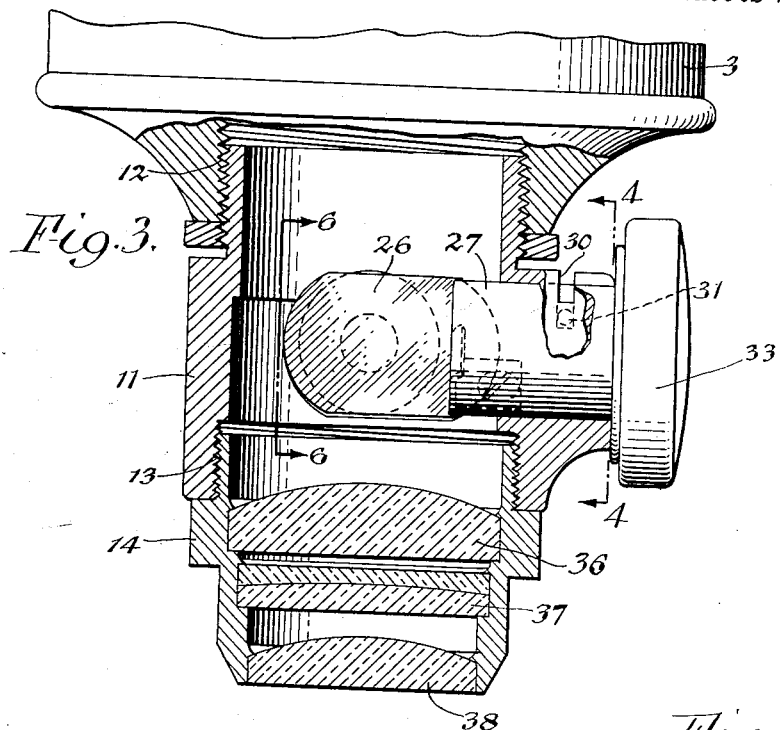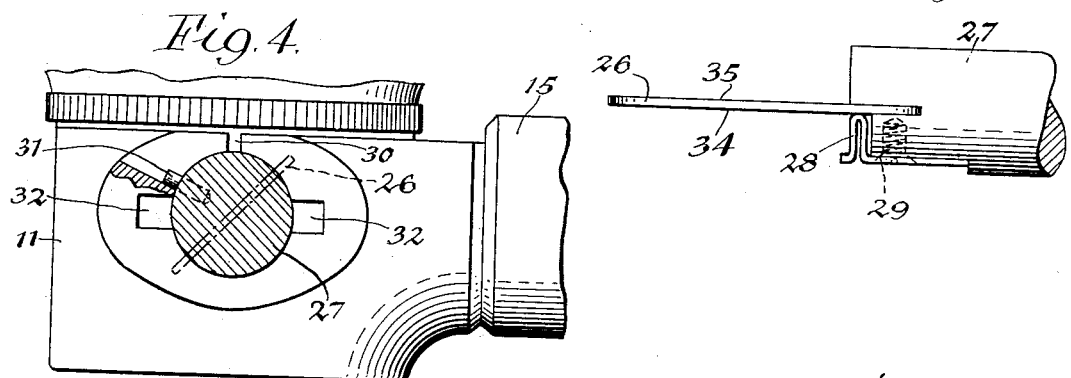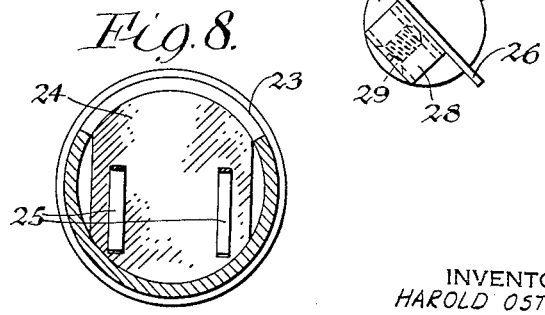

Patented May 23, 1944

2,349,457

UNITED STATES PATENT OFFICE 2,349,457

VERTICAL ILLUMINATOR FOR MICROSCOPES

Harold Osterberg, Buffalo, and Kennard W. Harper, East Aurora, N. Y., assignors to Spencer Lens Company, Buffalo, N. Y., a corporation of New York Application January 2, 1941, Serial No. 372,850

1 Claim. (Cl. 88—40)

This invention relates to a vertical illuminating device for microscopes or the like, that is, apparatus in which the illumination enters the microscope from one side and is then passed downwardly through the microscope itself to illuminate the object which is to be examined.

An object of the invention is to provide a vertical illuminator for microscopes so constructed as to allow maximum interchangeability in a variety of microscopes without disturbance of the optical adjustments of the instrument.

Another object of the invention is to provide such a device in which the glare formed in the eyepiece of a microscope embodying a vertical illuminator is removed.

Another object of the invention is to provide a device of the type set forth having a reflector assembly which is easily removed from the instrument and the reflector easily and quickly removed from its assembly for cleaning or the like.

Another object of the invention is to provide a new and improved means for supporting said reflector.

Another object of the invention is to provide a reflector of higher reflecting power for a device of the type set forth and which will minimize glare and loss of definition produced by the reflector itself.

Other objects and advantages of the invention will be apparent from the following description taken in connection with the accompanying drawings, and it will be understood that many changes may be made in the details of construction and arrangement of parts without departing from the scope of the invention as set forth in the appended claim. We therefore do not wish to be limited to the exact details of construction and arrangement of parts shown and described as the preferred form has been shown by way of illustration only.

Referring to the drawings:

Fig. 1 is a side view of a microscope embodying the invention;

Fig. 2 is an enlarged sectional view of the vertical illuminator device;

Fig. 3 is a sectional view taken on line 3—3 of Fig. 2;

Fig. 4 is a sectional view taken on line 4—4 of Fig. 3 looking in the direction of the arrows;

Fig. 5 is a side view of the reflector and reflector support;

Fig. 6 is a sectional view taken on line 6—6 of Fig. 3 looking in the direction of the arrows;

Fig. 7 is a sectional view taken on line 7—7 of Fig. 2 looking in the direction of the arrows; and Fig. 8 is a sectional view taken on line 8—8 of Fig. 2 looking in the direction of the arrows.

In the construction of microscopes it is essential that the optics of the instrument be adjusted for definite lengths. We have found it very desirable that the vertical illuminator be made substantially the same length as the standard or quick-change nosepiece and therefore allow interchangeability of said vertical illuminator with said nosepieces without disturbing the optical adjustment of the instrument.

Referring more particularly to the drawings wherein similar reference characters designate corresponding parts throughout the several views, the microscope containing the vertical illuminator of the invention comprises the base 1 on which is pivotally supported the upright or stand 2 supporting the usual body tube 3 and having the stage 4 on which is placed the object to be examined 5. The microscope has the eyepiece 6 extending upwardly from the body tube 3. Secured to this eyepiece tube 6 adjacent the upper edge of the body portion 3 is the adjustable support made up of a plurality of sections 7 pivoted to each other at the pivots 8 and to the outer end of which is pivotally secured the illuminator or light source 9. The adjustable support has a clamp ring adapted to be secured to said eyepiece tube 6 by means of the clamping or set screw 10 to retain the support in associated relation with the instrument and by means of adjusting the pivoted levers 7 the light source may be adjusted to desired relation.

At the lower end of the body tube 3 of the usual microscope the standard nosepiece is removed and the vertical illuminator proper 11 having the threaded portion 12 threaded into the threaded support for the nosepiece.

On the lower extremity of the vertical illuminator unit is secured the objective 13 by means of the threaded connection 14.

Through one side of the vertical illuminator proper 11 is an opening into which is frictionally fitted the reduced end of the tube 15 supporting the iris diaphragm 16 and compensating lens 17. By using a compensating lens 17 the light source 9 may be positioned much nearer the vertical illuminator than shown in Fig. 1. The illuminator proper 11 has an opening and the tube 15 has a corresponding aligned opening and in these openings is placed the key or pin 18 to align the parts.

Adjacent the outer end of the tube 15 is frictionally inserted the filter support member 19 having the telescoping portion 20 adapted to enter and frictionally engage the inside of the tube 15 and having the slot 21 to provide resiliency to retain said tubes in telescoped relation. The outer end of the tubular member 15 and the forward end of the body portion 19 are also provided with aligned slots adapted to retain the key or pin 22 to align the parts. The body portion 19 of the filter support has the opening 23 adapted to contain colored filters or the like 24 which are retained in position by the spring 25.

The projecting portion 20 of the filter support 19 and the forwardly projecting portion of the tubular member 15 are of the same diameter so that they are interchangeable. Thus if it is desired to use only the filter holder the projecting portion of the filter holder is adapted to enter into the opening in the side of the vertical illuminator proper or if it is desired to use both the iris diaphragm and filter holder they can be used as shown in Fig. 2.

It is also pointed out that in some cases it may be desired to omit both the filter holding tube and iris diaphragm tube and merely align the light source with the opening in the side of the vertical illuminator proper.

It will be noted that the interchangeability of the parts as stated above provides for both flexibility and convenience.

The reflector 26 is adapted to enter into a slot in the forward end of the reflector support 27 and be frictionally retained therein by the resiliency of the spring member 28 which is secured to said support 27 by means of the screw 29. This allows the reflector to be easily disengaged from the support 27 for cleaning or the like and then merely pushed back into operative connection. The reflector support 27 is provided with the thumb wheel or knob 33 adapted for turning the reflector to desired angular position.

The reflector support 27 is provided with a pin 31 adapted to enter in a T-shaped slot 30 to assemble the parts in operative relation. When the reflector is inserted into the vertical illuminator proper it is placed horizontally so that its ends enter through the slots 32 in the illuminator proper at which time the pin 31 is in line with the slot 30 and then the knob 33 is turned and the pin 31 which slides in the slot 30 holds the parts in assembled relation and the reflector is then turned to desired angular relation to reflect light entering through the tubes 15 and 19 down onto the object 5 on the stage 4 and the object is viewed through the microscope eyepiece and the body tube.

The reflector 26 is provided on its lower face 34 with a multi-layer film with high reflecting power. This multi-layer film is made up of a plurality of layers of alternately high and low index of refraction, for example, an outer layer of titanium oxide one-quarter wave length in thickness, and an inner layer of cryolite one-half wave length in thickness on the glass. It is apparent that while the above is a simple example that the reflective power can be increased by adding additional alternative layers. If desired it is only necessary to use a single layer of material of higher index of refraction such as titanium oxide. This provides a transparent reflector which reflects the light from the light source 9 which enters into the vertical illuminator proper onto the object 5 but at the same time allows viewing of the object through the microscope, vertical illuminator and reflector 26. The reflector 26 is treated on its upper face 35 with a single layer film for minimizing reflections as disclosed by Cartwright Patent No. 2,207,656.

The reflecting film on the lower surface of the reflector 26 may be from 10% to 50%.

The lenses 36, 37 and 38 of the objective are each treated on their exposed surfaces with a non-reflective film as disclosed by the Cartright patent. This serves to eliminate glare formed in the eyepiece by the surfaces of the objective lenses and greatly improves contrast in the visual or photographic image.

From the above it will be seen that we have provided simple, efficient and economical means for obtaining all of the advantages of the invention and for eliminating the disadvantages of prior art vertical illuminators.

Having described our invention, we claim:

A vertical illuminator for microscopes including a body portion having an opening for admitting light at one side thereof at an angle to the optical axis of the microscope, a tubular member slidable in said opening and frictionally retained therein, a second tubular member having a portion in telescoping relation with said first tubular member and frictionally retained therein, said tubular member extending into said opening having an iris diaphragm adjacent the end thereof extending into said opening and said second tubular member having a filter holding portion and an opening in said portion to allow rapid insertion or removal of filters in said filter holding portion, means for aligning said tubular members with each other, a partial reflector in said optical axis in alignment with said tubular members, means for angularly adjusting said reflector, said iris diaphragm being adjacent said reflector and said reflector being arranged at an angle to the optical axis to reflect light admitted through said tubular members into the illuminator to the object and said reflector being adapted to allow light rays from the object to pass therethrough to the eye of the observer.

HAROLD OSTERBERG.
KENNARD W. HARPER.